US009481229B2

(12) United States Patent
Fischer et al.

(10) Patent No.: US 9,481,229 B2
(45) Date of Patent: Nov. 1, 2016

(54) PROTECTION DEVICE FOR A VEHICLE INTERIOR

(71) Applicants: Martin Fischer, Altbach (DE); Christoph Beutel, Winterbach (DE); Danja Sperr, Leuterbach (DE); Nina Roeschinger, Lorch (DE); Darren Ketteringham, Nuertingen (DE)

(72) Inventors: Martin Fischer, Altbach (DE); Christoph Beutel, Winterbach (DE); Danja Sperr, Leuterbach (DE); Nina Roeschinger, Lorch (DE); Darren Ketteringham, Nuertingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 16 days.

(21) Appl. No.: 14/317,009

(22) Filed: Jun. 27, 2014

(65) Prior Publication Data

US 2015/0000848 A1 Jan. 1, 2015

(30) Foreign Application Priority Data

Jun. 28, 2013 (DE) .................. 10 2013 212 556
May 14, 2014 (DE) .................. 10 2014 209 144

(51) Int. Cl.
*B60J 3/02* (2006.01)
*B60J 1/20* (2006.01)

(52) U.S. Cl.
CPC .............. *B60J 1/2027* (2013.01); *B60J 1/2044* (2013.01); *B60J 1/2052* (2013.01); *B60J 1/2086* (2013.01)

(58) Field of Classification Search
CPC .... B60J 1/2027; B60J 1/2044; B60J 1/2052; B60J 1/2086
See application file for complete search history.

(56) References Cited

U.S. PATENT DOCUMENTS

| 6,086,133 | A | * | 7/2000 | Alonso | 296/97.8 |
| 7,316,443 | B2 | * | 1/2008 | Schlecht | 296/97.8 |
| 2006/0021721 | A1 | * | 2/2006 | Walter | B60J 1/2027 160/315 |
| 2006/0290162 | A1 | * | 12/2006 | Schlecht | 296/97.8 |
| 2010/0013261 | A1 | * | 1/2010 | Takeuchi et al. | 296/97.4 |

FOREIGN PATENT DOCUMENTS

| DE | 198 03 129 B4 | 8/1999 |
| DE | 10 2004 060 208 A1 | 6/2006 |
| DE | 10 2005 029 559 B4 | 12/2006 |

OTHER PUBLICATIONS

Office Action of German Patent Office issued in Application No. 10 2014 209 144.6 dated Feb. 26, 2016 (5 pages).

* cited by examiner

*Primary Examiner* — Katherine Mitchell
*Assistant Examiner* — Scott Denion
(74) *Attorney, Agent, or Firm* — Flynn, Thiel, Boutell & Tanis, P.C.

(57) ABSTRACT

A protection device for a vehicle interior having a flexible planar formation movable between stored rest and tensioned protection positions. The formation is provided at a front end region in a tensioning direction with a dimensionally stable draw-out profile member guided between the rest and protection positions by at least one guide arrangement. The draw-out profile member includes a longitudinal compensator to compensate for deviations between movement directions of the guide arrangement and the draw-out profile member. The guide arrangement has at least one linearly guided carrier element, and the draw-out profile member includes an undercut compensation groove which extends in the longitudinal direction of the draw-out profile member and which is open towards the carrier. The carrier comprises a longitudinally displaceable sliding or rolling element which is retained in a positive-locking manner in the receiving groove in the opening direction of the compensation groove.

6 Claims, 5 Drawing Sheets

PROTECTION DEVICE FOR A VEHICLE INTERIOR

CROSS REFERENCE TO RELATED APPLICATIONS

This application claims the priorities of the German patent applications DE 102013212556.9 and DE 102014209144.6, the disclosure of these is hereby incorporated into this application.

FIELD OF THE INVENTION

The invention relates to a protection device for a vehicle interior having a flexible planar formation which is supported in a movable manner between a compactly stored rest position and a tensioned protection position and which is provided at a front end region at the front in the tensioning direction with a dimensionally stable draw-out profile member which is guided between the rest position and the protection position of the planar formation by means of at least one guide arrangement, the draw-out profile member being provided with longitudinal compensation means in order to compensate for deviations between movement directions of the guide arrangement and the draw-out profile member.

BACKGROUND OF THE INVENTION

Such a protection device is preferably provided as a sun protection device in order to shade side windows or rear windows or transparent roof regions of vehicle interiors. The protection device may also be provided as an approximately horizontally deployable storage space cover or as an approximately vertically tensionable separation device between the passenger space and the storage space.

DE 10 2004 060 208 A1 provides for a sun protection device in the form of a shading device for a side window of a private motor vehicle. The shading device has a flexible planar formation which is provided with a dimensionally stable draw-out profile member at the front-end region thereof. The draw-out profile member is displaceably supported on a guide rail which is retained in a stationary manner on the side door, a deployment direction of the draw-out profile member differing from an orientation of the guide rail. That deviation is obtained by a longitudinal compensation means in the form of an elongate hole, through which a screw connected to a guide carriage extends. The elongate hole is provided in the draw-out profile member.

SUMMARY OF THE INVENTION

An object of the invention is to provide a protection device of the type mentioned in the introduction which allows a low-noise compensation for deviations in the movements of the draw-out profile member, on the one hand, and the guide arrangement, on the other hand.

This object is achieved in that the guide arrangement has at least one linearly guided carrier element, in that the draw-out profile member is provided with an undercut compensation groove which extends in the longitudinal direction of the draw-out profile member and which is open towards the carrier, and in that the carrier comprises a longitudinally displaceable sliding or rolling element which is retained in a positive-locking manner in the receiving groove in the opening direction of the compensation groove.

The sliding or rolling element is displaceable in the undercut compensation groove of the draw-out profile member with little noise. The term "undercut" is intended to mean that the compensation groove has a cross-section profile which is in particular C-like and in which the cavity, in which the sliding or rolling element is linearly movable, is constructed so as to be wider than a longitudinal slot of the compensation groove, by means of which slot the compensation groove is open in the direction towards the carrier. If the draw-out profile member is of strip-like form, the compensation groove is centrally integrated in a wide longitudinal side of the strip-like draw-out profile member. In an advantageous manner, the compensation groove is integrally provided in the draw-out profile member. The draw-out profile member is preferably produced as an extrusion profile member from a light metal alloy. Alternatively, the draw-out profile member may also comprise plastics material. The dimensions of the sliding or rolling element are selected so that the sliding or rolling element is guided in the compensation groove in a dimensionally precise manner for linear displaceability.

In an embodiment of the invention, the carrier has an extension which extends through the open side of the compensation groove and which is connected to the sliding or rolling element in a rigid or articulated manner. The extension may protrude transversely or angled to a movement direction of the carrier. The extension may be connected to the sliding or rolling element in a releasable or non-releasable manner. If a rolling element which is provided with one or more wheels or rollers is provided, the extension may also comprise bearing journals for rotatably supporting the at least one wheel or the at least one roller.

In another embodiment of the invention, the carrier can be displaced in the guide arrangement by a drive means. In particular, a drive transmission cable in the form of a threaded shaft which is also referred to as a flexible shaft is provided as the drive means, the drive transmission cable being driven by a drive motor in the form of an electric motor.

The object of the invention is also achieved in that the draw-out profile member is constructed in several pieces from a hollow profile member and at least one insert profile member which is linearly movable in a telescope-like manner in the hollow profile member, the insert profile member having a plurality of elastically resilient tongue or tab portions which are arranged so as to be distributed over the length of the insert profile member and which project outwards in the width extent and/or thickness extent of the insert profile member beyond an outer contour of the insert profile member. The tongue or tab portions ensure a permanent abutment against the inner wall of the hollow profile member so that rattling noises or tilting of the insert profile member during operation of the protection device may be prevented in a private motor vehicle. The occurrence of rattling or scraping noises is thereby reduced. It is further possible to have improved displaceability of the insert profile member in the hollow profile member since, as a result of the contact of the tongue or tab portions in the region of the inner wall of the hollow profile member, a reduced friction is produced. Instead of at least one tongue portion, which protrudes in relation to a thickness of the insert profile, a sliding strip such as a piece of felt fabric or the like can similarly be applied to the insert profile.

In an embodiment of the invention, the tongue or tab portions are provided in the region of recesses of the insert profile member and are integrally formed from the insert profile member. The recesses ensure that the tongue or tab portions have a sufficiently resilient movability.

In another embodiment of the invention, the insert profile member is produced from plastics material. In this embodiment, a low-friction material pairing may be obtained between the material of the hollow profile member and the material of the insert profile member by the plastics material being suitably selected. The integral production of the insert profile member together with the tongue or tab portions ensures a cost-effective production and a reliable securing of the tongue or tab portions in the insert profile member.

BRIEF DESCRIPTION OF THE DRAWINGS

Other advantages and features of the invention will be appreciated from the claims and the following description of preferred embodiments of the invention which are illustrated with exemplary reference to the drawings.

DETAILED DESCRIPTION

Figure 1:
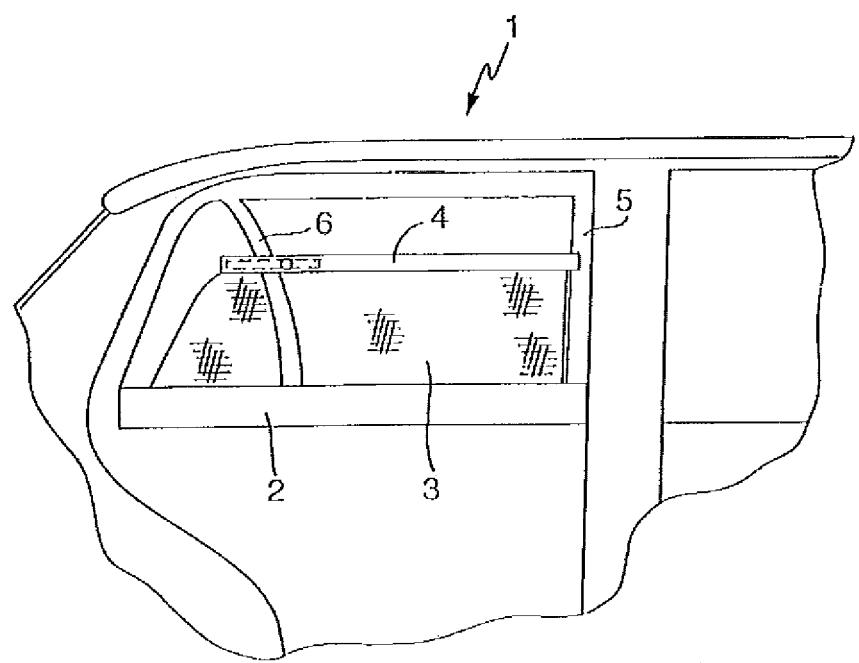
FIG. 1 is a schematic view of an embodiment of a protection device according to the invention in the region of an inner side of a side door of a private motor vehicle.

According to FIG. 1, a private motor vehicle has a vehicle interior 1 which is provided with a protection device according to the invention in the region of a rear side door in one embodiment. The protection device is used to shade a side window arrangement of the rear side door. The protection device comprises a cartridge housing 2 which is fixed at the inner side to the rear side door in the region of an internal door trim. The cartridge housing 2 is used to rotatably support a winding shaft which is not shown and on which a flexible planar formation in the form of a shading formation 3 is retained so as to be able to be wound and unwound. The shading formation 3 is movably supported between a wound rest position in which it is stored inside the cartridge housing 2 and a deployed protection position in which it covers the surface of the side window arrangement. The shading formation 3 has, at the front end region at the front in the deployment direction, a dimensionally stable draw-out profile member 4 which is guided in door-side guide arrangements 5, 6 between the rest position and the protection position of the shading formation 3. The guide arrangement 5 extends parallel with a deployment direction of the shading formation 3. However, the guide arrangement 6 is orientated in an inclined manner relative to the movement direction, that is to say, relative to the deployment direction or draw-in direction of the shading formation 3, the guide arrangement 6 extending obliquely upwards and backwards—in relation to a normal travel direction of the private motor vehicle—from a vehicle waistline. The guide arrangement 6 may constitute a carrier portion of the rear side door.

A carrier 7 is supported in a rail portion of the guide profile arrangement 6 in a linearly movable manner and can be displaced along the guide arrangement 6 by means of a drive transmission cable 8 in the form of a threaded shaft. The guide rail of the guide arrangement 6 is open in the direction counter to the draw-out profile member 4. The carrier 7 has an extension 9 which projects out of a guide slot which defines the open side of the guide rail and which is angled around the guide arrangement 6 in the direction of the draw-out profile member 4. The extension 9 has at the free end thereof a bearing journal (not illustrated in greater detail) for a rolling element 10 which may also be in the form of a sliding element in an embodiment of the invention which is not illustrated.

The rolling element 10 can be displaced in a linearly movable manner in a compensation groove 11 of the draw-out profile member 4. The compensation groove 11 is provided with a longitudinal slot which is open in the direction towards the carrier 7 and therefore the guide arrangement 6, whose width is smaller than a width of the compensation groove 11. An undercut for the rolling element 10 is thereby produced in edge regions 12 of the compensation groove 11 and the associated longitudinal slot and retains the rolling element 10 in the compensation groove 11 in a non-releasable manner. The undercut ensures that the rolling element cannot be moved out of the compensation groove 11 transversely relative to the longitudinal direction of the compensation groove 11. The compensation groove 11 and the associated longitudinal slot thereof extend in the longitudinal direction of the draw-out profile member 4 over a length which corresponds at least to a necessary compensation length between the movement path of the draw-out profile member 4 and the guide path determined by the guide arrangement 6 in relation to the positions of the draw-out profile member 4 in the rest position of the shading formation 3, on the one hand, and in the deployed protection position of the shading formation 3, on the other hand.

If the draw-out profile member 4 is now drawn approximately vertically upwards out of the rest position thereof, the carrier 7 is necessarily displaced in the guide arrangement 6 from the inner side to the outer side, whereby the rolling element 10 moves in the compensation groove 11. The shading formation 3 is still reliably guided over the entire draw-out path. The guiding of the draw-out profile member 4 in the opposite guide arrangement 5 does not have any characteristic feature because that guide arrangement 5 extends parallel with the draw-out path of the draw-out profile member 4 and the shading formation 3.

Figure 2:
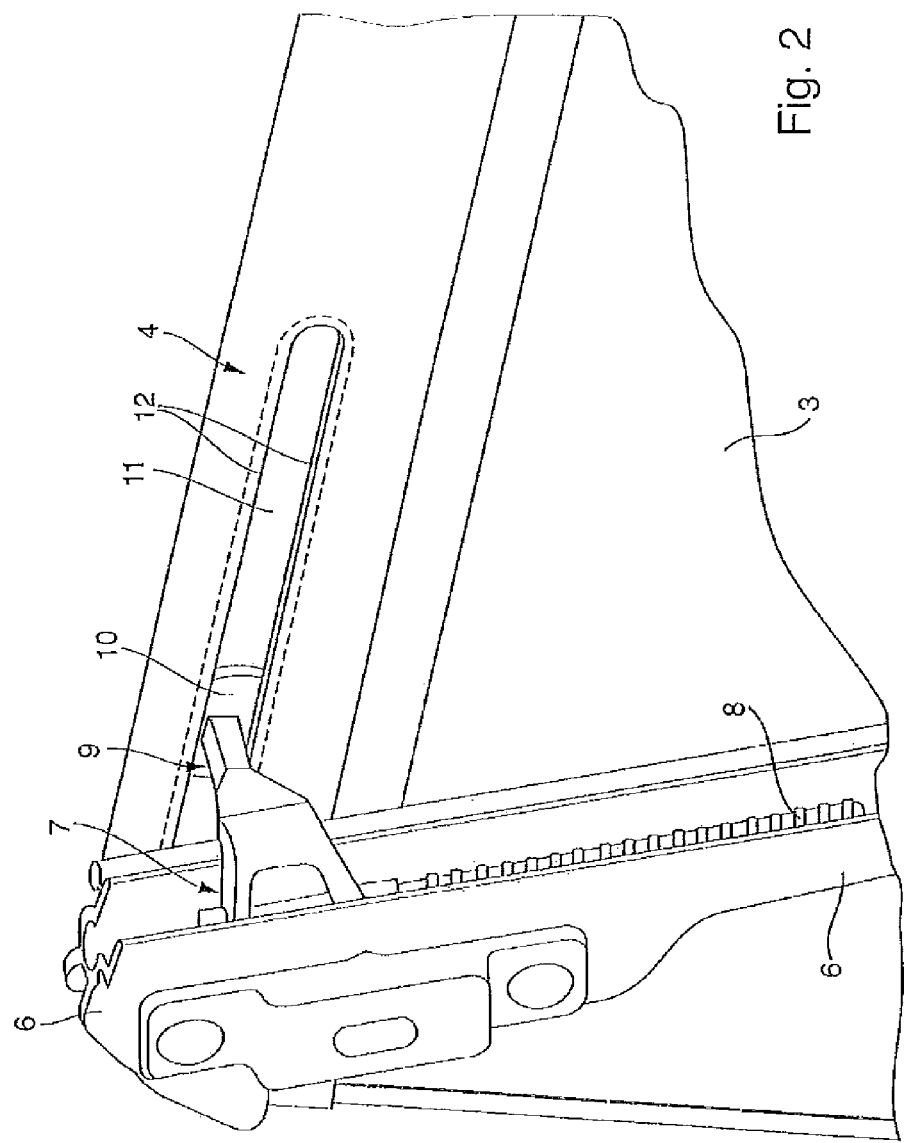
FIG. 2 is an enlarged isometric view of a cutout of the protection device according to FIG. 1.
Figure 3:
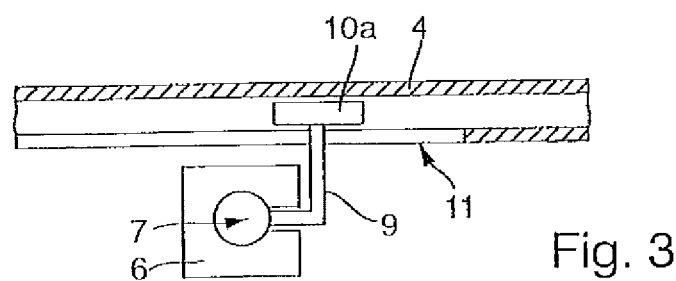
FIG. 3 is a schematic view of a cutout of the protection device according to FIG. 1.
Figure 4:
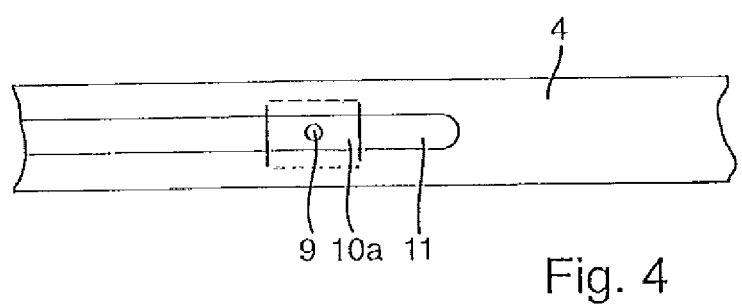
FIG. 4 is another schematic view of the cutout according to FIG. 3.

FIGS. 3 and 4 schematically illustrate that a sliding element 10a is provided in place of the rolling element 10 according to FIG. 2, which sliding element 10a is guided in the compensation groove in a slidingly movable manner. Further reference may be made to the explanations regarding FIGS. 1 and 2.

Figure 5:
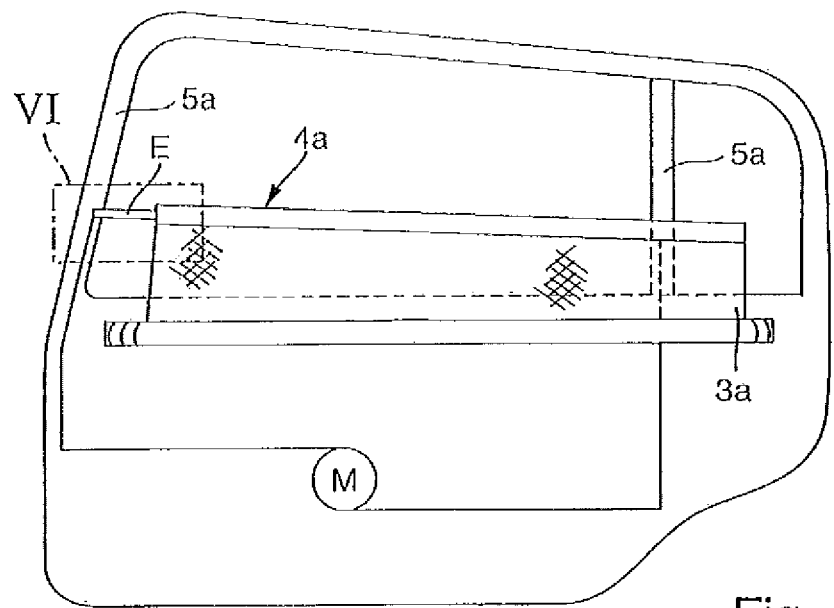
FIG. 5 is a schematic view of another embodiment of a protection device according to the invention in the region of an inner side of a side door of a private motor vehicle.
Figure 6:
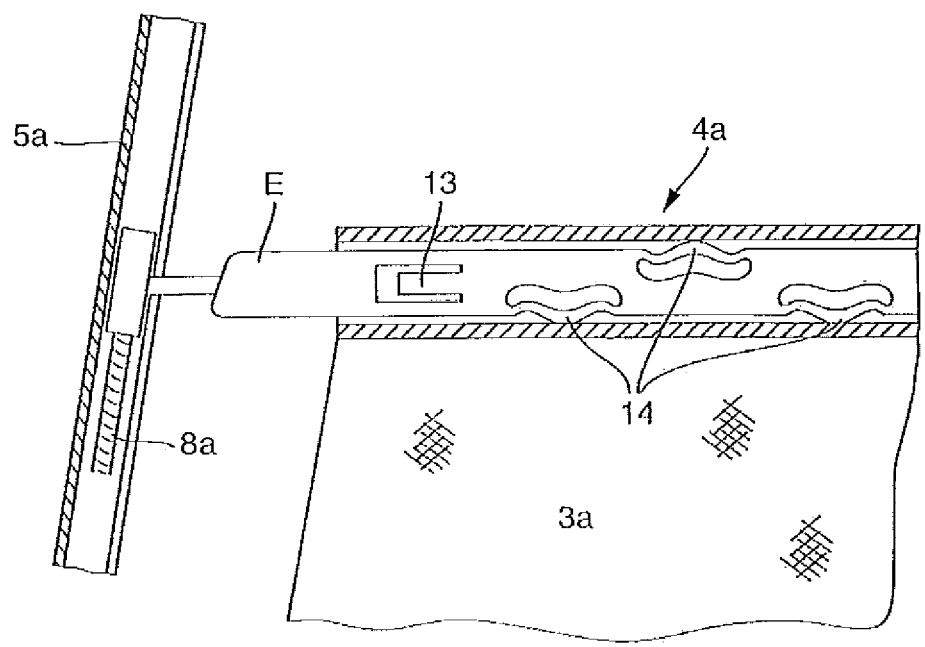
FIG. 6 is an enlarged cross-section of a cutout VI according to FIG. 5.
Figure 7:
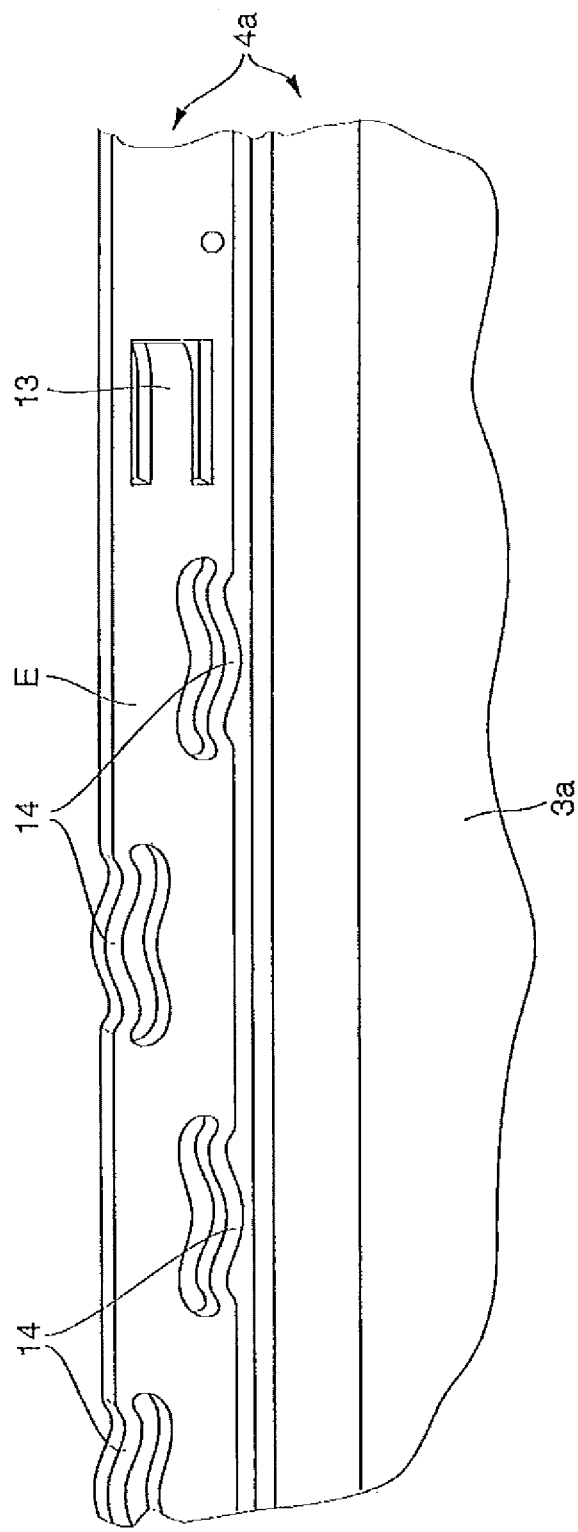
FIG. 7 is a cutout of an insert profile member in the region of a draw-out profile member of a protection device according to FIG. 5, which draw-out profile member is fixed to a flexible planar formation.

In the embodiment according to FIGS. 5 to 7, a flexible planar formation 3a is provided at the front side with a draw-out profile member 4 which is constructed in several pieces similarly to the shading formation 3 according to FIG. 1. The draw-out profile member 4a comprises a hollow profile member which is not illustrated and an insert profile member E which is retained in the hollow profile member in a longitudinally displaceable manner. As a result of the relative displaceability between the insert profile member E and the hollow profile member of the draw-out profile member 4a, desirable longitudinal compensation actions of the draw-out profile member are ensured in the event of non-parallel guide arrangements. In this embodiment, consequently, the total length of the draw-out profile member 4a also necessarily changes in accordance with the position of the draw-out profile member 4a. The insert profile member E is guided via a carrier in a guide arrangement 5a which is arranged in the region of a door frame of the side door of the private motor vehicle. A drive transmission cable 8a which is displaced via a drive motor M inside the guide arrangement 5a extends in the guide arrangement 5a. Another drive transmission cable extends in the other guide arrangement 5a which is illustrated on the right in FIG. 5.

In order to prevent the insert profile member E from having too much play inside the hollow profile member and in order to reduce friction between the hollow profile member and the insert profile member E, the insert profile member E is provided with a plurality of tongue portions and tab portions 13, 14 in a state distributed over the length thereof. FIGS. 6 and 7 illustrate a tab portion 13. FIGS. 6 and 7 further show four tongue portions 14. The tongue and tab portions 13, 14 are integrally formed from the insert profile member E. To this end, recesses are provided in the region of the tongue and tab portions 13, 14 and ensure a resilient flexibility of the tongue and tab portions 13, 14. The tongue and tab portions 13, 14 are integrally formed from the insert profile member E. The insert profile member E is produced from a thermoplastic synthetic material and substantially has a planar strip-like form. The tab portions 14 are provided in the manner of webs which are curved in a wave-like manner at opposing lateral edge regions of the insert profile member E. The recesses which are also wave-like and which are arranged adjacent to the tab portions 14 ensure sufficient resilient compensation possibilities of the tab portions 14 in an inward direction, respectively. The tab portions 14 project outwards with their wave-like or hump-like projections beyond the outer contour of the strip-like insert profile member E. The tongue portion 13 also projects outwards relative to the outer contour of the insert profile member E transversely relative to the direction of curvature of the tab portions 14 and acts as a play compensation member in the thickness direction of the insert profile member E. However, the tab portions 14 act as a play compensation member in the width extent of the insert profile member E. The tongue portion 13 serves to slidingly guide without play or with low play the insert profile member E inside the hollow profile member (which is not illustrated) in a transverse direction, whereas the tab portions 14 which protrude upwards and downwards beyond the outer contour of the insert profile member E act as a play compensation member in the vertical direction. In a not illustrated exemplary embodiment of the invention, the insert profile has merely a few, in particular two to four, tab portions (on corresponding longitudinal edges) distributed over the length of the insert profile to guide said insert profile. Instead of one or more tongue portions, which protrude outwards in relation to a thickness of the insert profile, a sliding strip in the form of a felt fabric strip or the like can be applied in this embodiment, in order to achieve a low-play guidance of the insert profile in the hollow profile member.

As a result, a displaceability of the insert profile member E is ensured in a manner without play in the corresponding hollow profile member in which the tab portions 14 at opposite sides of the insert profile member E and corresponding tongue portions 13, of which only one is illustrated in FIGS. 6 and 7, ensure support on corresponding inner wall faces of the hollow profile member transversely relative to the orientation of the tab portions 14, so that the insert profile member E abuts the inner walls of the hollow profile member substantially in the region of the tab portions 14 and tongue portions 13.

The invention claimed is:

1. A protection device for a vehicle interior, the protection device comprising:
   a flexible planar formation which is supported in a movable manner in a tensioning direction from a compactly stored rest position to a tensioned protection position, the flexible planar formation being provided at a front end region thereof at a front in the tensioning direction with a rigid draw-out profile member which is guided between the compactly stored rest position and the tensioned protection position of the flexible planar formation by at least one guide arrangement, the rigid draw-out profile member compensating for deviations between movement directions of the at least one guide arrangement and the rigid draw-out profile member, wherein the at least one guide arrangement has at least one linearly guided carrier element, the rigid draw-out profile member being provided with an undercut compensation groove extending in a longitudinal direction of the rigid draw-out profile member and which is open towards the at least one linearly guided carrier element, and the at least one linearly guided carrier element comprises a longitudinally displaceable sliding or rolling element which slides or rolls within the undercut compensation groove along with being positively retained within the undercut compensation groove, wherein the longitudinally displaceable sliding or rolling element cannot disengage from the undercut compensation groove.

2. The protection device according to claim 1, wherein the at least one linearly guided carrier element has an extension which extends through an open side of the undercut compensation groove and which is connected to the sliding or rolling element in a rigid or articulated manner.

3. The protection device according to claim 1, wherein the at least one linearly guided carrier element can be displaced in the at least one guide arrangement by a drive.

4. A protection device for a vehicle interior, the protection device comprising:
   a flexible planar screen movable between a compactly stored rest position and a tensioned protection position;
   a rigid draw-out member connected to an end edge of the flexible planar screen; and
   at least one guide arrangement for moving the rigid draw-out member for moving the flexible planar screen between the rest position and the protection position;
   the at least one guide arrangement having at least one guided carrier element;
   the rigid draw-out member having an undercut compensation groove extending along the rigid draw-out member, the undercut compensation groove having a smaller slot opening into a larger receiving area of the undercut compensation groove; and
   the at least one guided carrier element comprising a longitudinally displaceable element which moves within the larger receiving area of the undercut compensation groove along with being positively retained within the undercut compensation groove by a wall surrounding the smaller slot opening;
   wherein the longitudinally displaceable element cannot disengage from the undercut compensation groove.

5. The protection device according to claim 4, wherein the at least one guided carrier element has an extension extending through the smaller slot opening of the undercut compensation groove and being connected to the longitudinally displaceable element.

6. The protection device according to claim 5, wherein the at least one guided carrier element is displaced in the at least one guide arrangement by a drive.

\* \* \* \* \*